US010776510B2

(12) United States Patent
Antonelli et al.

(10) Patent No.: US 10,776,510 B2
(45) Date of Patent: Sep. 15, 2020

(54) SYSTEM FOR MANAGING PERSONAL DATA

(71) Applicant: Telecom Italia S.p.A., Milan (IT)

(72) Inventors: Fabrizio Antonelli, Turin (IT); Corrado Moiso, Turin (IT); Mattia Pasolli, Povo (IT); Michele Vescovi, Povo (IT)

(73) Assignee: Telecom Italia S.p.A., Milan (IT)

( * ) Notice: Subject to any disclaimer, the term of this patent is extended or adjusted under 35 U.S.C. 154(b) by 354 days.

(21) Appl. No.: 15/313,841

(22) PCT Filed: May 26, 2014

(86) PCT No.: PCT/EP2014/060803
§ 371 (c)(1),
(2) Date: Nov. 23, 2016

(87) PCT Pub. No.: WO2015/180749
PCT Pub. Date: Dec. 3, 2015

(65) Prior Publication Data
US 2017/0140171 A1    May 18, 2017

(51) Int. Cl.
*G06F 21/62*    (2013.01)
*G06F 21/31*    (2013.01)

(52) U.S. Cl.
CPC .......... *G06F 21/6245* (2013.01); *G06F 21/31* (2013.01); *G06F 21/6272* (2013.01);
(Continued)

(58) Field of Classification Search
CPC ... G06F 21/6245; G06F 21/31; G06F 21/6272
(Continued)

(56) References Cited

U.S. PATENT DOCUMENTS 8,051,491 B1*  11/2011  Cavage ............... G06F 21/6218
                                                  726/30
8,646,032 B2*   2/2014  Aad .................... G06F 21/604
                                                  726/1
(Continued)

OTHER PUBLICATIONS

Yuhong Nan, "Finding Clues for Your Secrets: Semantics-Driven, Learning-Based Privacy Discovery in Mobile Apps", Feb. 2018, NDSS, pp. 1-14 (Year: 2018).*

(Continued)

*Primary Examiner* — Alexander Lagor
*Assistant Examiner* — Gregory A Lane
(74) *Attorney, Agent, or Firm* — Banner & Witcoff, Ltd.

(57) ABSTRACT

A method for managing personal data of a user of a user device is provided. The user device is adapted to have installed thereon an application (APP). The APP is configured to require access to the personal data when running on the user device. The method comprises creating a certification for the APP, the certification being based on a corresponding statement providing information regarding the relationship between the APP and personal data; associating the certification to the APP for certifying the APP; allowing the user to provide user-defined policies about exploiting the user personal data; checking whether the user-defined policies provided by the user are compatible with requirements of the APP defined in the corresponding statement. If the user-defined policies are compatible with the requirements of the APP defined in the statement, the method executes operations when the APP running on the user device requires to access personal data.

13 Claims, 5 Drawing Sheets

(52) U.S. Cl.
CPC .............. *G06F 2221/2111* (2013.01); *G06F 2221/2115* (2013.01); *G06F 2221/2141* (2013.01)

(58) Field of Classification Search
USPC ............................................ 726/1
See application file for complete search history.

(56) References Cited

U.S. PATENT DOCUMENTS

| | | | |
|---|---|---|---|
| 9,405,930 B2* | 8/2016 | Vestevich | G06F 21/6263 |
| 2006/0265760 A1* | 11/2006 | Daemke | G06F 21/604 |
| | | | 726/27 |
| 2011/0137817 A1* | 6/2011 | Roumeliotis | G06Q 50/265 |
| | | | 705/325 |
| 2011/0161172 A1* | 6/2011 | Lee | G06Q 30/02 |
| | | | 705/14.55 |
| 2012/0221955 A1* | 8/2012 | Raleigh | H04M 15/00 |
| | | | 715/736 |
| 2014/0025949 A1 | 1/2014 | Kay et al. | |
| 2014/0032733 A1* | 1/2014 | Barton | H04L 41/00 |
| | | | 709/223 |
| 2014/0129599 A1 | 5/2014 | Boccon-Gibod | |
| 2014/0163967 A1* | 6/2014 | Aratsu | G06F 17/27 |
| | | | 704/9 |
| 2014/0283023 A1* | 9/2014 | Flavin | G06F 21/6263 |
| | | | 726/21 |
| 2015/0113588 A1* | 4/2015 | Wing | H04L 63/0227 |
| | | | 726/1 |

OTHER PUBLICATIONS

Jul. 24, 2014—(WO) International Search Report and Written Opinion—App PCT/EP2014/060803.

Min Mun et al: "Personal data vaults", Proceedings of the 6th International Conference On, Co-next '10, Jan. 1, 2010 (Jan. 1, 2010), p. 1, XP055129100, New York, New York, USA DOI: 10.1145/1921168.1921191 ISBN: 978-1-45-030448-1.

Stefania Gnesi et al: "My Data, Your Data, Our Data: Managing Privacy Preferences in Multiple Subjects Personal Data" In: "Field Programmable Logic and Application", May 21, 2014 (May 21, 2014), Springer Berlin Heidelberg, Berlin, Heidelberg, XP055129147, ISSN: 0302-9743 ISBN: 978-3-54-045234-8 vol. 8450, pp. 154-171, DOI: 10.1007/978-3-319-06749-0_11.

Corrado Moiso et al: "How do I Manage my Personal Data?—A Telco Perspective", Jan. 1, 2012 (Jan. 1, 2012), XP055129153, Retrieved from the Internet: URL:http://www.mobileterritoriallab.it/pdf/20120601_Data-2012-final-v1.0.pdf [retrieved on Jul. 15, 2014].

"Rethinking Personal Data Project" promoted by World Economic Forum (Worlds Economic Forum, Rethinking Personal DATA: Strengthening Trust, (Jan. 2012), www.weforum.org/issues/rethinking-personal-data).

* cited by examiner

SYSTEM FOR MANAGING PERSONAL DATA

BACKGROUND OF THE INVENTION

Field of the Invention

The present invention generally relates to the field of data management. Specifically, the present invention relates to a system for managing personal data in digital scenarios.

Description of the Related Art

Presently, data turn out to be an essential resource in a wide range of digital scenarios, comprising computer systems, communication networks, engineering processing systems, wireless networks, electronic commercial systems, social networks, as well as in the emergent "smart city" and "smart space" scenarios.

Through data mining and social mining techniques, data has become an invaluable source of information for portraying and describing communities and individuals (hereinafter, "users") under multiple perspectives. Within these scenarios one of the most interesting class of data are represented by the so-called Personal Data (PD), i.e. data related to, and/or (e.g., dynamically) generated by single individuals, which describe their socio-demographic information, their actions and activities, their preferences, their behavior, their life-style and context, and so on.

PD may comprise static data (e.g. socio-demographic information) as well as dynamic data (e.g. position expressed via GPS) related to a specific user, both explicitly provided by the user himself/herself or implicitly collected through a user device and/or a sensor, or generated by the fruition of personal services. Dynamic data comprise in turn "real-time" data, i.e., data representing the current, instantaneous state of the user or of her/his user devices and/or sensors (e.g., the current GPS location thereof or the Web page the user is browsing), as well as "historic" data, i.e., an archive of past streams of real-time data, which describe the evolutions of the state of the user and the "transactions" in which such user has been involved.

Collections of PD can be organized and managed both as collections of homogeneous data of a same kind and/or of a same source and/or with the same informative content regarding different users (e.g., either as the whole data of the totality of customers/users or specific sub-groups or communities), and as collections of heterogeneous data of different types and/or from different sources and/or with different informative content concerning one (the same) specific user. In the latter case, the collection of heterogeneous data concerning a specific user is often referred to as "digital footprint" of the user. The digital footprint comprises the whole set of data trails left by the interactions of a user in any digital scenario, as well as any data that can be used to portray and describe such user.

Presently, the amount of PD available and generated on a daily basis is rapidly growing due to the increasing number of online and digital activities (e.g., with a digital identity) enabled by a widespread adoption of user devices (e.g., smartphones, tablets). Through the user devices, people is now able to access a large amount of online services and interact with a large amount of real-world services (e.g., payments, ticketing, check-in, searches). Moreover, the amount of PD available and generated on a daily basis is also growing due to the pervasiveness of sensors, either in the surrounding environment of users or integrated with user devices (such as, smartphones and tablets or wearable accessories, like wristbands), which enable collecting contextual information (such as locations, environmental conditions) or physiological information in a completely transparent way.

In view of the above, PD are nowadays mostly generated (or automatically sensed) during the interaction of users with their user devices. Thanks to the introduction of new user devices provided with advanced sensing features and increased computational powers, and thanks to the ever increasing number of mobile/online applications, the amount of generated PD will further increase in quantity, variety and quality (e.g., frequency, granularity and precision).

Manufacturers of user devices or operating systems host on their platforms applications (APPs) which can access/record PD by interacting with the physical resources of the user device (e.g., sensors), or by retrieving the PD already stored in the device itself (e.g., by accessing the memory or the file system thereof). Such APPs may also generate new (kinds of) PD by explicitly requesting them to users, implicitly collecting them from the users' behavior, device-interactions and activities using the APP itself or by combining and processing PD from different sources.

Manufacturers store the available APPs for their devices/operative-systems in APP publicly available marketplaces where developers can freely publish their APPs and where users can download (for free or paying a license) published APPs. Usually, the access of the APP to PD may be granted by users at the time of installation of the APP itself on the user device, or once-for-all by properly setting the user device. Moreover, granting the access to PD may also imply the request of a wide set of permissions on how these PD can be processed, stored and shared by the APP provider.

Typically, PD collected (accessed or generated) by APPs installed on a user device are diverse and highly dynamic, and may be exploited to describe the behavior of the user owning the same user device. For example, PD may comprise records of the activities carried out by the user of the user device, together with information exchanged during the activities, as well as records of the locations thereof.

On one hand, PD are of paramount value for companies providing services (both in the real and digital worlds). Indeed, such PD may be exploited to have a deep understanding of needs and behaviors of people and to create novel, more personalized offers and APPs. Moreover, PD may be sold for advertisement and/or statistics research purposes. Similarly, PD represent and invaluable opportunity and an irreplaceable resource also for public administrations in order to provide effective services to users and to improve (in terms of costs and efficiency) existing services to citizens.

On the other hand, unfortunately, the current scenario still doesn't fully allow an effective, efficient, controlled and righteous (with respect to users) exploitation of this opportunity. On the contrary, the management and the usage of such PD is raising new concerns about privacy and the need of new technological and regulatory solutions to give users more control over their data life-cycle. In fact, data are currently gathered and managed following a so-called "application-centric" paradigm, where PD of a single user (even with a unique user device) are collected independently by the different APPs installed on his/her user device(s).

Therefore, under a technical perspective, PD independently collected by different APPs are spread and fragmented, since the PD are collected and stored separately (locally or remotely) by different APP owners according to the access granted by the users and to the specific terms and conditions. Moreover, PD collected by different APPs are often redundant, since the same PD are accessed and replicated several times by different APPs, and unreliable, since PD is not stored in a single storage entity but instead multiple copies of the same information can be stored in different storage entities. Hence, PD can result to be inconsistent, out of date or noisy.

The actual way PD are collected by different APPs causes several disadvantages also under the user perspective. Indeed, PD are often not transparently collected by APPs. Even if the user of a user device has to grant the access to the source of the PD (e.g., the sensor or the file system), the majority of users have no control and knowledge on the quantity and quality of the collected PD (e.g., in which cases and with which frequency and accuracy PD are collected), on the nature and quantity of PD generated by the various APPs, and on the way PD are transmitted and replicated. Moreover, users are usually unaware on the exact informative content and potentials of the specific PD collected and processed by an APP. Users are often not enabled to have the whole picture and history of PD granted to the different APPs, and are not enabled to keep track of their usage. In particular, when replicated remotely by a service, PD can be mined, analyzed, processed or distributed in a way that is not transparent to the user, who lacks the control (e.g. to delete) her/his data.

In order to overcome the limitations of such application-centric paradigm, "user-centric" paradigms for personal data management have been recently proposed by several initiatives such as, e.g., the "Rethinking Personal Data Project" promoted by World Economic Forum (Worlds Economic Forum, Rethinking Personal DATA: Strengthening Trust, (January 2012), www.weforum.org/issues/rethinking-personal-data). These initiatives promote the introduction of higher levels of transparency and the possibility for users to have an effective control on the lifecycle of their PD (e.g., on their collection, storage, processing, sharing, exploitation, etc.). Moreover, several surveys showed that people empowered with a real control on their PD lifecycle are encouraged to share them more with other people, organizations and applications. In this perspective, the user-centric paradigm will enable a virtuous ecosystem of personal data management, where users are encouraged to unlock the potentials of their PD and where a larger availability and variety of PD will enable and encourage the growth of an unpredictable set of personal (tailored) and/or social applications and services, leveraging on a rich variety of user or aggregated information.

Known solutions embracing a user-centric approach for the PD management provide for the use of a so-called Personal Data Store (PDS). A PDS is defined as a secure digital space (owned and controlled by the user) acting as repository for PD, provided with a wide set of collection and management features. Several providers are starting to deliver to users PDS services for the management and exploitation of their PD; existing PDS platforms provide a set of functionalities enabling the data owners to have control on the entire lifecycle of their PD and capabilities to control the access to the data stored by specific services, for instance based on user-defined policies or rules.

Several known platforms are already implement PDS based services, such as "Danube" (http://projectdanube.org) and "Higgins" (http://eclipse.org/higgins/). Moreover, several companies are starting providing commercial PDS-like services, such as "Personal.com" (www.personal.com) and "Mydex" (mydex.org).

Other known PDS platform comprise the platform developed by IST TAS3 Project (http://www.tas3.eu), and the related open source software ZXID (www.zxid.org), and the OpenPDS developed by MIT (http://openpds.media.mit.edu/).

SUMMARY OF THE INVENTION

The Applicant has found that the solutions known in the art are not fully effective.

In general, known PDS platforms are able to deal with historic data (stored in some data space), but are not capable of monitoring how real-time data produced by the user devices are accessed by the APPs installed on such devices.

Moreover, known PDS platforms are focused on managing only a subset of the totality of possible PD, i.e., only the PD regarding the user profile attributes (such as address, gender or home address), and not generic datasets.

An aspect of the present invention provides for a method for managing personal data of a user of a user device. The user device is adapted to have installed thereon an APP. The APP is configured to require access to the personal data when running on the user device. The method comprises creating a certification for the APP, the certification being based on a corresponding statement providing information regarding the relationship between the APP and personal data; associating the certification to the APP for certifying the APP; allowing the user to provide user-defined policies about exploiting the user personal data; checking whether the user-defined policies provided by the user are compatible with requirements of the APP defined in the corresponding statement. If the user-defined policies are compatible with the requirements of the APP defined in the statement, the method provides for carrying out the following operations when the APP running on the user device requires to access personal data:

enforcing rules defined in the APP statement to guarantee that the APP accesses PD according to the requirements of the APP defined in the corresponding statement;

if, as a result of the enforcing rules, the requirements of the APP defined in the statement are not fulfilled, denying access to the personal data;

if, as a result of the enforcing rules, the requirements of the APP defined in the statement are fulfilled, carrying out the following operations:

if the APP requests to access real time personal data, collecting personal data from the user device according to the user-defined policies, and, if the personal data is to be collected, storing the accessed personal data in a secured digital space;

if the APP requests to access personal data already stored in the secured digital space, retrieving the personal data from the secured digital space according to the user-policies.

According to an embodiment of the present invention, the method further comprises, when the user executes the APP for the first time, carrying out an authorization process directed to allow the user to grant personal data access. The authorization process comprises generating an authorization token representing a specific user-APP subscription; carrying out the checking whether the user-defined policies provided by the user are compatible with requirements of the APP defined in the corresponding statement; if the user-defined policies are compatible with the requirements of the APP defined in the statement, activating the authorization token; if the user-defined policies are compatible with the requirements of the APP defined in the statement, suspending the authorization token to avoid the possibility that the APP requests personal data.

According to an embodiment of the present invention, the exploiting the user personal data comprises one or more of
accessing;
collecting;
using;
managing;
disclosing, and
sharing,
the user personal data.

According to an embodiment of the present invention, the requirements of the APP defined in the corresponding statement comprise one or more of:
a list of the specific personal data accessed, collected, shared, and/or generated by the APP;
the way the personal data are used;
the frequency of usage of the personal data, and
whether the APP requires a specific profile for the user or not.

According to an embodiment of the present invention, the method further comprises generating a log about one or more of:
outcomes of accesses of personal data by the APP;
personal data actually accessed by the APP, and
policy rules that have been enforced.

According to an embodiment of the present invention, the method further comprises processing the log to create reports on the general behavior of the APP and on accesses to the personal data of the user.

Another aspect of the present invention provides for a system for managing personal data of users of user devices. Each user device is adapted to have installed thereon APPs. The APPs are configured to require access to the personal data when running on the user device. The system comprises a personal data manager unit comprising for each user of a user device a corresponding secure digital space configured to store personal data that the user has authorized to collect; a first mediator unit configured to collect requests of personal data and logs regarding such requests, store such personal data and such requests in the personal data manager unit, and carry out verifying operations to decide whether to satisfy or refuse such collected requests of personal data, and a APP registry unit configured to store statements of APPs generated by developers of APPs, a statement of an APP providing information regarding the relationship between the APP and personal data. The APP registry unit is further configured to accept requests for certifications provided by the developers. The certifications are based on corresponding statements. The APP registry unit is further configured to allow the first mediator unit to access and use the statements in order to check if the personal data access requests made by an APP are compliant with requirements declared in the statement of the APP.

According to an embodiment of the present invention, a second mediator unit is provided, configured to operate as interface and mediator among APPs requiring to access/use personal data and sources of personal data, and to provide new personal data generated by/through such APPs According to an embodiment of the present invention, the system further comprises a server unit. The personal data manager unit, the first mediator unit and the APP registry unit are located on the server unit.

According to one embodiment of the present invention, the second mediator unit is installed on the user devices.

BRIEF DESCRIPTION OF THE DRAWINGS

These and other features and advantages of the present invention will be made evident by the following description of some exemplary and non-limitative embodiments thereof, to be read in conjunction with the attached drawings, wherein.

DETAILED DESCRIPTION OF EXEMPLARY EMBODIMENTS OF THE INVENTION

Figure 1:
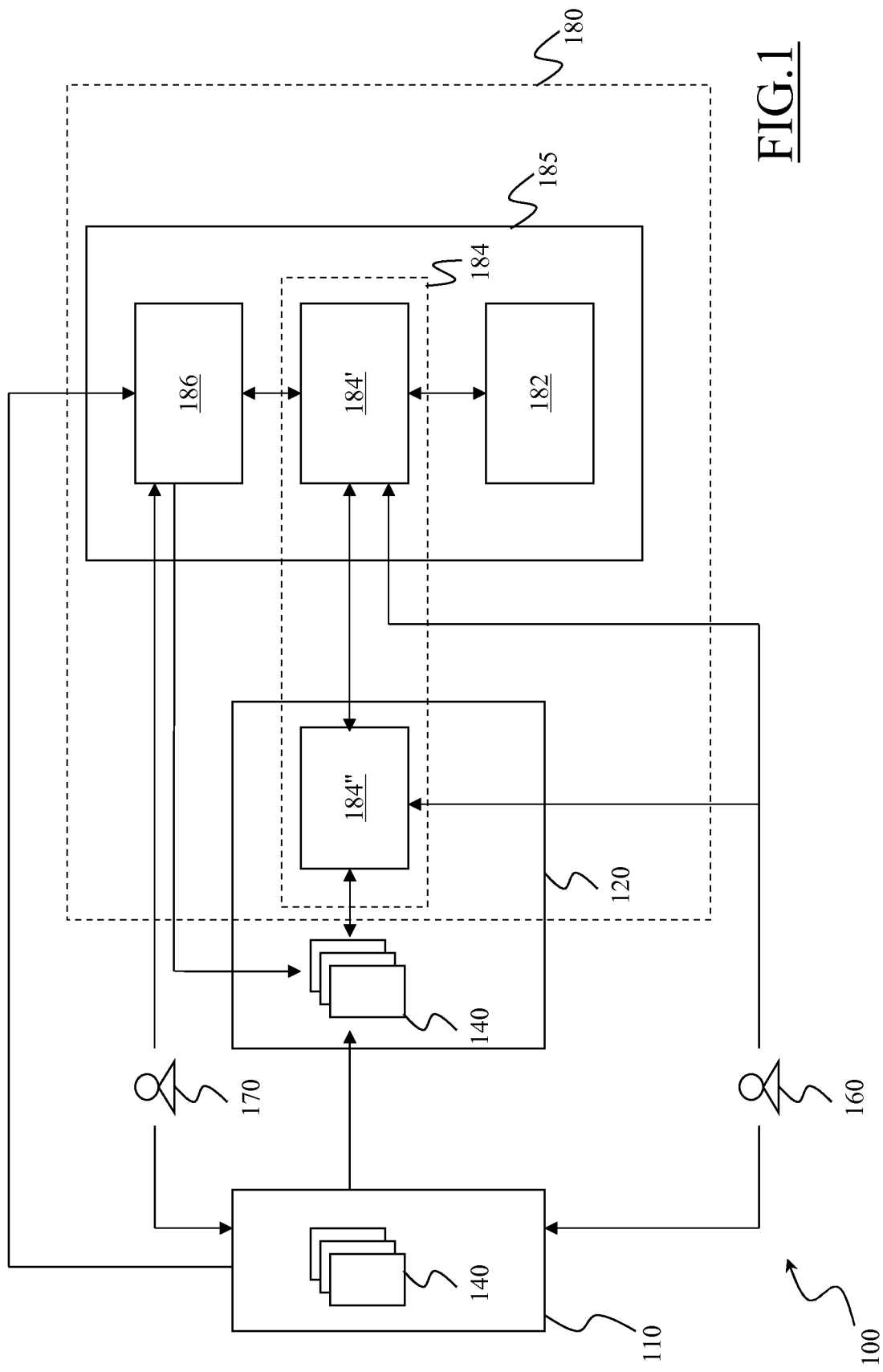
FIG. 1 illustrates an exemplificative scenario wherein a system for managing PD according to an embodiment of the present invention can be employed.

With reference to the drawings, FIG. 1 illustrates an exemplificative scenario 100 wherein a system for managing PD according to an embodiment of the present invention can be employed. In this exemplificative scenario 100 there are an APP distribution platform 110 and one or more user devices 120 (only one illustrated in FIG. 1).

The APP distribution platform 110 implements a service, usually managed by a device or operating system manufacturer, for freely distributing or selling third-party or proprietary APPs 140.

The APPs 140 distributed by the APP distribution platform 110 are application software adapted to be installed onto the user devices 120 for being exploited by users 160 of the user devices 120 in order to avail of their functionalities. As will be described in the following, APPs 140 generally require to access PD of the users 160 to fully provide the expected functionalities.

Each user device 120 is a physical or logical device, system, or space adapted to run APPs 140 and to generate, collect, and/or execute PD of the user 160 of the user device 120. The user device 120 may be for example a mobile device (such as a smartphone, a tablet or a smart camera), an application server, a personal computer, a personal cloud space.

APPs 140 distributed by the APP distribution platform 110 are developed (e.g., researched, designed, implemented and tested) by developers (e.g. software companies), overall identified in figure with reference 170.

According to an embodiment of the present invention, a PD managing system 180 is provided for managing PD generated, collected, and/or executed by the APPs 140 running on the user devices 120. The PD managing system 180 is designed to allow users 160 to selectively grant APPs 140 downloaded on their user device 120 to access PD, as well as to provide users 160 with setting options in order to define policies about exploitation of the user PD for ruling the granted PD accesses.

According to an embodiment of the present invention, the PD managing system 180 is a client/server system comprising software and/or hardware modules located at the user devices 120 as well as at a server unit 185.

According to an embodiment of the present invention, the PD managing system 180 comprises three main modules, referred to as Personal Data Manager (PDM) 182, mediator 184 and APP registry 186.

The PDM 182 comprises for each user 160 of a user device 120 a corresponding secure digital space which is mainly configured to store PD that the user 160 has authorized to collect. Such secure digital space is generally located on the server unit 185, however some portions thereof may be also located in the user device 120 itself. The PDM 182 may for example directly store the PD of the users 160 in a memory unit provided on the server unit 185, or may simply store logical references to the actual PD, which are in this case stored in a different, remote unit. The PDM 182 is configured to provide the users 160 with a set of control functionalities over his/her PD, such as the possibility of verifying, visualizing and deleting PD already stored, the possibility of managing the way new PD generated are collected and stored, as well as the possibility of managing the way the stored PD may be retrieved to fulfill PD retrieval requests based on user-defined policies.

The mediator 184 is a software component located both at the server unit 185 (server-side mediator 184') and at the user devices 120 (client-side mediator 184"). The server-side mediator 184' is configured to collect PD-related requests and logs regarding such requests, store such logs and PD in the PDM 182, and carry out verifying operations to decide whether to satisfy or refuse the received PD-related requests. The client-side mediator 184" is configured to operate as interface/mediator among the APPs 140 requiring to access/use PD and the PD sources, or to provide new PD generated by/through such APP.

More in detail, the server-side mediator 184' is configured to carry out the following operations:

For each APP 140 installed on the user device 120 of a user 160, storing corresponding user-defined policies defined by such user 160 about PD access, collection, usage, management and disclosure/sharing.

Dynamically enforcing the user-defined policies, in order to check in real time the compliance of the APP 140 behaviors with respect to the policies.

Accessing the PDM 182 to retrieve PD, corresponding to a user 160, requested by an APP 140 running on the user device 120 of the user 160. The access is granted only if it is compliant with the policies defined by the user 160 for that APP 140 and, as will be described later on, with a statement declared by the developer 170 of the APP 140. Hereinafter, with "statement" of an APP 140 it is intended a digital document providing information regarding the relationship between the APP and PD. For example, the statement may provide a list of the specific PD accessed/collected/shared/generated by the APP 140, the way such PD are used, the frequency of usage of such PD, and whether the APP 140 requires a specific profile for the user or not.

Storing log records of requests to access, memorize and/or use PD coming from an APP 140 and enabling the generation of corresponding reports describing the dynamic behavior of the APPs 140 (in terms of accessed, generated, collected and used data, as well as in terms of its frequency, quantity and quality).

Serving as a broker between the PDM 182 and user devices 120 which are running APPs 140, managing the flow of PD in both directions, i.e., from the user devices 120 to the PDM 182 (so as to allow to store PD collected and/or generated by the user devices 120) and from the PDM 182 to the user devices 120 (so as to allow the retrieval of stored PD, if compliant with the corresponding policies).

Creating an abstraction layer (e.g., for anonymization, pseudo-anonymization, reduction of precision, and/or aggregation purposes) over the collected PD toward specific APPs 140 or third parties trying to access the PD.

Providing users 160 with an interface for visualizing, verifying, deleting and setting PD stored in the PDM 182.

Provide the APP distribution platform 110 with reports describing the dynamic behavior of the APPs 140.

It has to be appreciated that some of the functionalities of the server-side mediator 184' may be also implemented by the PDM 182. In this case, the PDM 182 may be designed to carry out some of the abovementioned operations.

The client-side mediator 184" is configured to carry out the following operations:

Serving as a broker between APPs 140 running on user devices 120 and the operating system thereof, for receiving and satisfying (or refusing) requests for specific PD coming from the APPs 140 in order to guarantee a trusted and transparent access to the PD.

Collecting PD accessed in real time by APPs 140 or PD directly generated by APPs 140 to be stored in the PDM 182 for being managed.

Serving as a broker of historic PD requests between the server side mediator 184' and the APPs 140.

Intercepting and monitoring any request of PD coming from APPs 140, so as to record and log the effective behavior of the APPs 140.

Synchronizing with the server side mediator 184' to exchange PD requested by APPs 140 or accessed/generated in real-time.

Since the client-side mediator 184" strongly interacts with the operating system of the user device 120, some of the functionalities of the client-side mediator 184" may be also implemented by a module of the operating system itself.

The APP registry 186 is a component located at the server unit 185 which is configured to memorize information about the PD usage by compliant APPs 140, making available some functionalities relating to the interaction of such APPs 140 with the PDM 182 and the mediator 184.

More in detail, the APP registry 186 is configured to carry out the following operations:

Accept requests for certifications provided by developers 170 of APPs 140. Hereinafter, with "certification" it is intended a digital document generated by the APP registry 186 based on the statement provided by the developer for being associated with an APP 140 in order to certify requests by the developer. Once a certification is associated with an APP 140, such APP 140 is linked to the statement the certification is based on.

Store statements corresponding to APPs 140 published in the APP distribution platform 110.

Provide the APP distribution platform 110 with information about the certifications.

Allow the mediator 184 to access and use the statements of the APPs 140 in order to check if the PD access requests made by an APP 140 are compliant with the requirements declared in the statement of the APP 140.

Reference will be now made to FIGS. 2 to 5, which are sequence diagrams of interactions among modules of PD managing system 180, a user 160, a developer 170 and/or the APP distribution platform 110 according to an embodiment of the present invention.

Figure 2:
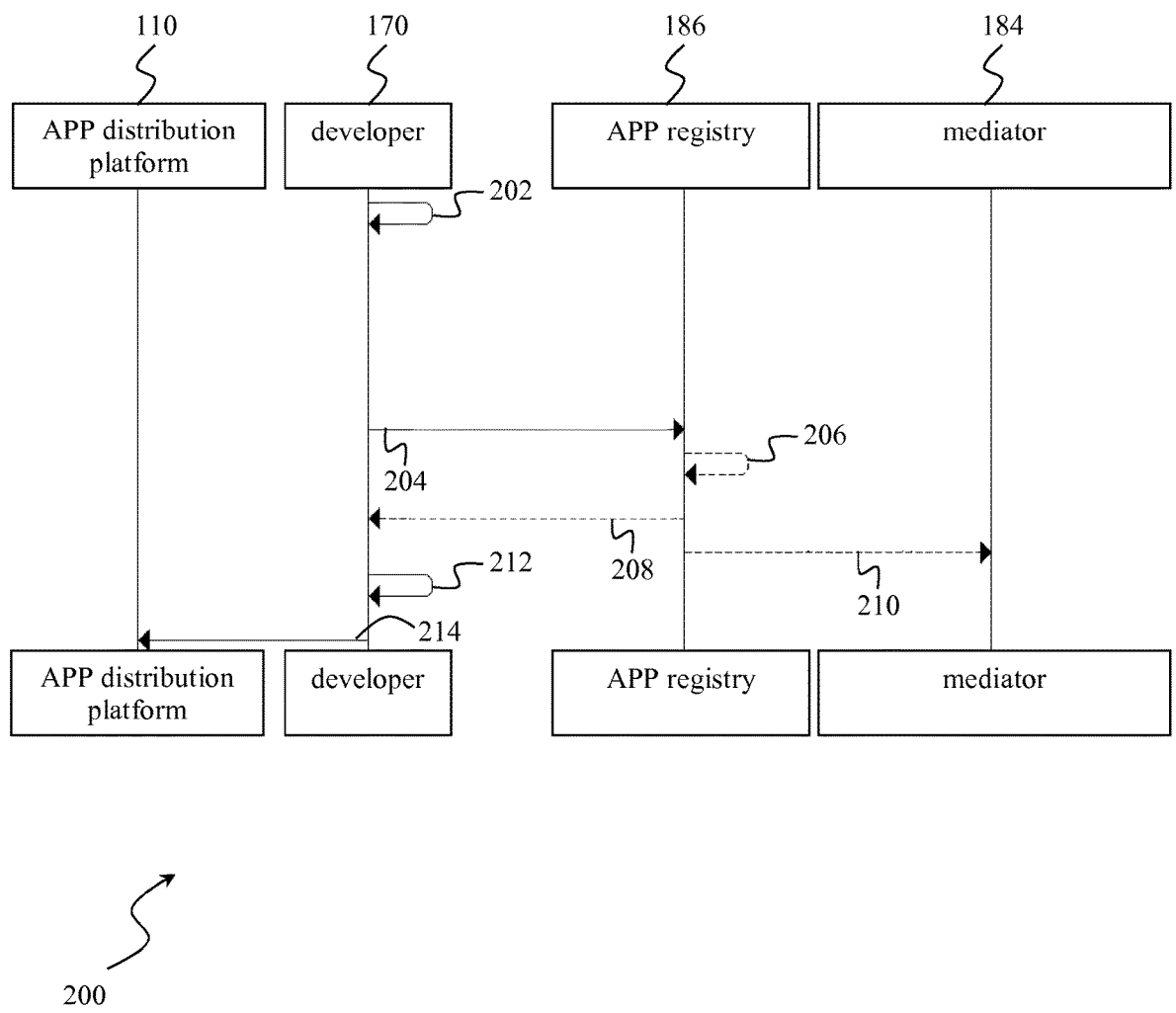
FIG. 2 is a sequence diagram of interactions among the PD managing system, a developer and an APP distribution platform, when the developer is publishing onto the APP distribution platform a newly developed APP which requires to access PD, according to an embodiment of the present invention.

FIG. 2 is a sequence diagram 200 of interactions among the PD managing system 180, a developer 170 and the APP distribution platform 110, when the developer 170 is publishing onto the APP distribution platform 110 a newly developed APP which requires to access PD, according to an embodiment of the present invention.

The developer 170 develops an APP 140 requiring PD access (interaction 202).

Prior to publish the APP 140 onto the APP distribution platform 110, the developer 170 requests a certification for that APP to the APP registry 186 (interaction 204). For this purpose, the developer 170 provides the APP registry 186 with a corresponding statement listing the types of PD the APP 140 will access during the operation, together with information relating to the type of PD access. The interaction between the developer 170 and the APP registry 186 may be performed by means of web forms or other equivalent mechanisms.

Therefore, the APP registry 186 generates a digital document used to identify the APP 140 (hereinafter referred to as APP-token). Then, based on the received statement, the APP registry 186 generates a corresponding certification of the APP 140 (interaction 206). As already mentioned above, the certification links the APP 140 to the corresponding statement defined by the developer 170. The certification is a univocal object, such as for example a numeric identification number or a string of characters, which is attached to the APP 140 and is configured to be exploited during interactions with the PD managing system 180 for certifying requests by the developer 170.

The APP-token and the certification are then secured (e.g., cryptographically signed) by the APP registry 186 and sent back to the developer 170 (interaction 208). As will be described in the following, the APP-token is adapted to be used by the corresponding APP 140 when the latter requests to access PD. The certification is further advantageously provided with a link to a human-readable version of the statement that may be attached to the APP 140 when published on the APP distribution platform 110.

Then, based on the requirements of the received statement, the APP registry 186 further generates a set of rules for ruling the way the PD are accessed by the APP 140 during its operation, and provides them to the mediator, e.g., the server side mediator 184' (interaction 210). For example, the rules may be in form of conditions about the PD access and in form of rules about the way collected PD may be processed. The APP registry 186 is further configured to associate the rules to the APP-token.

The developer 170 adds the received APP-token to the APP 140 (interaction 212).

Then, the developer 170 publishes the APP 140 onto the APP distribution platform 110 (interaction 214); together with the documentation describing the APP 140, the developer 170 also publishes the link to the human-readable version of the statement thereof provided by the APP registry 186. This phase may be carried out using a protocol/interface offered by the APP distribution platform 110.

The operations described with reference to FIG. 2 are referred to the interactions among the PD managing system 180, the developer 170 and the APP distribution platform 110, when the developer 170 is publishing onto the APP distribution platform 110 a newly developed APP 140. However, similar considerations apply if the developer 170 is updating an APP 140 already published on the APP distribution platform 110.

Figure 3:
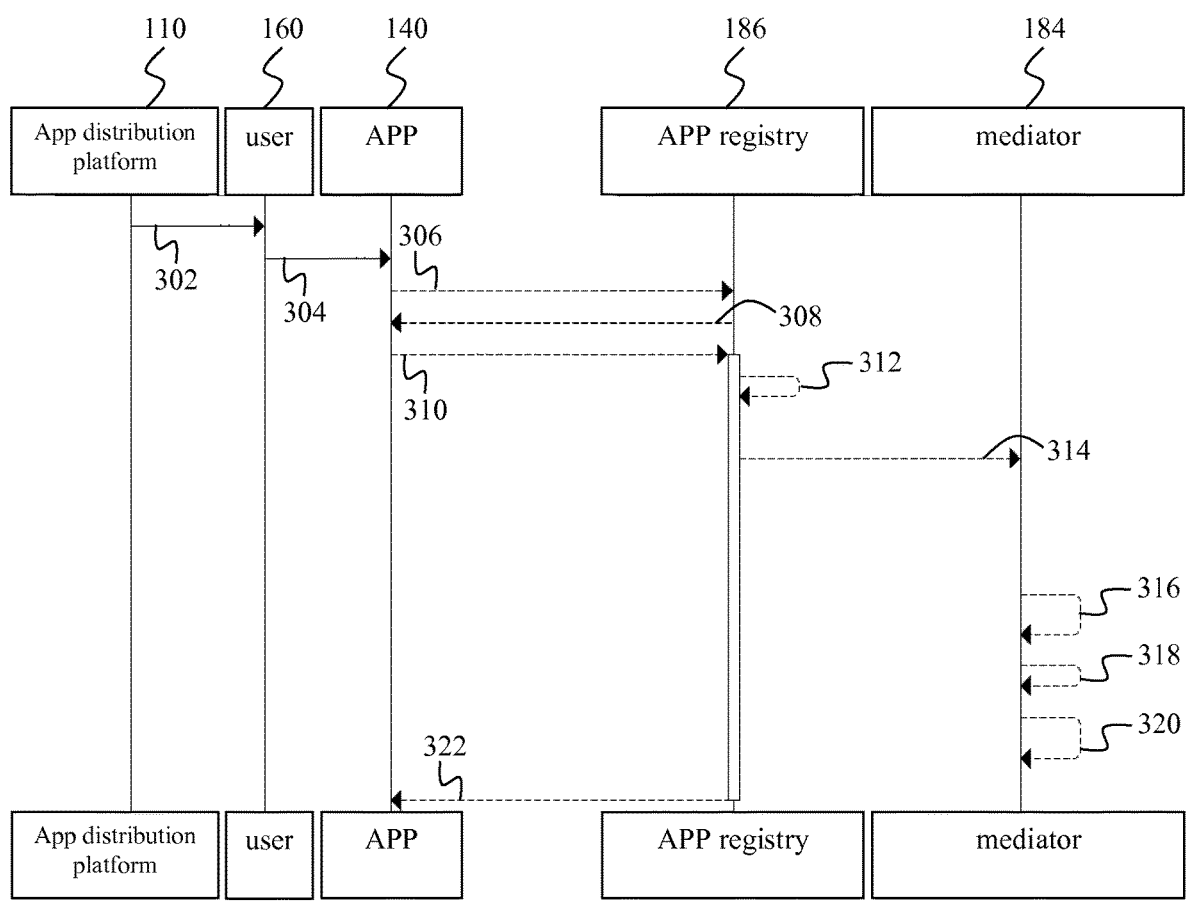
FIG. 3 is a sequence diagram of interactions among the PD managing system, a user and the APP distribution platform, when the user is authorizing and activating an APP published onto the APP distribution platform according to an embodiment of the present invention.

FIG. 3 is a sequence diagram 300 of interactions among the PD managing system 180, a user 160 and the APP distribution platform 110, when the user 160 is authorizing and activating an APP 140 published onto the APP distribution platform 110 according to an embodiment of the present invention.

The user 160 accesses the APP distribution platform 110 (e.g., by accessing a web site) and searches and selects a desired APP 140 according to the procedures provided by the APP distribution platform 110 (interaction 302). During the searching, the user 160 may request additional information on how the retrieved APPs 140 manages PD, by following the link to the human-readable version of the statement corresponding to the APPs 140. Moreover, the user 160 may be further provided with a (e.g., real-time) report on how active instances of the APPs 140 already activated and authorized by other users 160 access PD.

When the user 160 executes a selected APP 140 (interaction 304) for the first time, an authorization process directed to allow the user 160 to grant PD access is initiated. For example, the authorization process may be carried out according to an existing protocol, such as OAuth2.0.

The authorization process initiates with a requests of authorization carried out by the APP 140 toward the APP registry 186 (interaction 306).

In response to the authorization requests carried out by the APP 140, the APP registry 186 generates a secured (e.g., cryptographically signed) digital document representing the specific user-APP subscription (hereinafter referred to as "authorization token") and provides it to the APP 140 or to a new instance of the APP 140 associated with the user 160 (interaction 308).

Afterward, the APP 140 provides the APP registry 186 with the authorization token for its activation and the APP-token generated during the procedure already described with reference to FIG. 2 (interaction 310).

The APP registry 186 retrieves the set of rules associated with the APP-token and generated during the procedure already described with reference to FIG. 2 (interaction 312).

The APP registry 186 sends the retrieved set of rules, the authorization token, and the APP-token to the mediator 184 (e.g., the server-side mediator 184') (interaction 314).

The mediator 184 (e.g., the server-side mediator 184') verifies the authorization token, and then compares the user-defined policies with the retrieved set of rules for checking whether the user-defined policies are compatible with the requirements of the APP 140 defined in the corresponding statement (interaction 316).

At this point, the outcome of the authorization process of the APP 140 is notified, and the user may decide to activate/suspend the authorization token for that APP 140 based on such outcome, in such a way to allow/avoid the possibility that the APP 140 requests PD (interaction 318). Particularly, if the user-defined policies are not compatible with the requirements of the APP 140 defined in the corresponding statement, the user may suspend the authorization token; if the user-defined policies are instead compatible with the requirements of the APP 140 defined in the corresponding statement, the user may activate the authorization token.

In case the user-defined policies are compatible with the requirements of the APP 140 defined in the statement, if the statement provides for the possibility to access PD on the user device 120, the mediator 184 sends the relevant information to enable the accesses (e.g., the authentication token, the APP-token, the relevant portion of the statement) to the client side mediator 184" (interaction 320).

If the procedure terminated with success, the APP 140 is activated on the user device 120 of the user 160 (interaction 322), and the APP 140 is allowed to make requests of accessing PD of that user 160.

Figure 4:
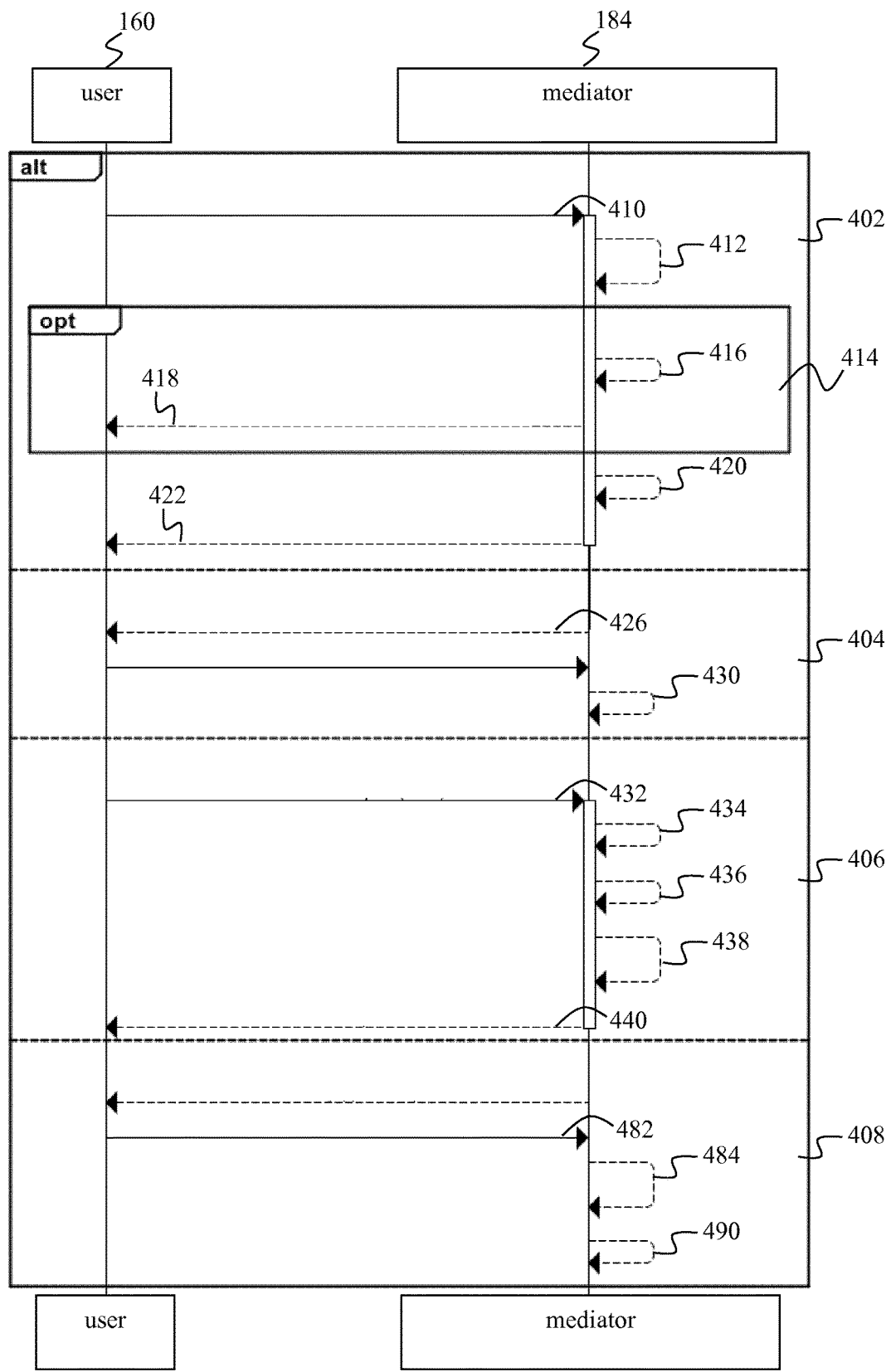
FIG. 4 is a sequence diagram of interactions among the PD managing system and a user, when the user is configuring his/her user-defined policies and is monitoring the requests to access his/her PD according to an embodiment of the present invention.

FIG. 4 is a sequence diagram 400 of interactions among the PD managing system 180 and a user 160, when the user 160 is configuring his/her user-defined policies and is monitoring the requests to access his/her PD according to an embodiment of the present invention. The interactions are performed through an interface (e.g., a web interface or a mobile APP) provided by the mediator 184.

The sequence diagram 400 illustrated in FIG. 4 provides for allowing users 160 to configure his/her user-defined policies and to monitor the PD access requests in four different ways:

creating/reading/updating/deleting the user-defined policies (alternative 402);

granting special/high level permissions to an authorization token, and therefore to the corresponding APP 140 (alternative 404);

accessing reports on how PD are accessed by the authorized APPs 140 (alternative 406);

managing authorization tokens corresponding to an APP (alternative 408).

Making reference to the alternative 402, when a user 160 desires to create/read/update/delete his/her user-defined policies relating to an APP 140, the user 160 sends a corresponding request to the mediator 184—e.g., the server side mediator 184'—(interaction 410). If the request relates to the creation of new policy rules or to the update of existing ones, the server side mediator 184' checks (interaction 412) for possible inconsistencies between the new user-defined policies (or the updated version of previous user-defined policies) and the permissions previously agreed with an authorized APP 140.

If inconsistencies are found (option 414), the server side mediator 184' may temporarily suspend the authorization token corresponding to the APP 140 until the inconsistencies are resolved, in such a way to avoid the possibility that the APP 140 requests PD (interaction 416) and provide a corresponding notification to the user 160 (interaction 418).

If no inconsistencies are found, the server side mediator 184' serves the request of the user 160 (interaction 420), for example coding new policy rules provided by the user 160 in a selected policy language, and then returns the results to the user 160 (interaction 422).

Making reference to the alternative 404, when a user 160 desires to grant an APP 140 special/high level permissions to access PD, he/she sends a corresponding request to the mediator 184 (e.g., the server side mediator 184') (interaction 426), which accordingly applies the changes to the corresponding authorization token (interaction 430).

Making reference to the alternative 406, if the user 160 desires to receive reports on how PD are accessed by the authorized APPs 140, he/she sends a corresponding request to the server side mediator 184' (interaction 432).

The mediator, e.g., the server side mediator 184' gets all the APPs 140 used by the user 160 together with the corresponding certifications (interaction 434).

Then, the mediator 184 (e.g., the server side mediator 184') gets the user-defined policies (interaction 436), compares the various certifications (and therefore, the statements) with the user-defined policies to generate a corresponding report (interaction 438) and provides such report to the user (interaction 440).

Making reference to the alternative 408, when a user 160 desires to (temporarily or permanently) suspend an authorization token—in order to avoid that the corresponding APP 140 requests PD—or activate a suspended authorization token—in order to allow that the APP 140 requests PD, the user 160 sends a corresponding request to the mediator 184 (e.g., the server side mediator 184') (interaction 482).

After the request provided by the user 160 is received, the mediator 184 (e.g., the server side mediator 184') compares the user-defined policies with the requirements of the APP 140 defined in the corresponding statement (interaction 484) and, based on the request provided by the user 160, the mediator 184 (e.g., the server side mediator 184') suspends or activates the authorization token (interaction 490).

The server side mediator 184' is configured to interact, if necessary, with the client side mediator 184" in order to align information modified during the operation previously described with reference to FIG. 4.

Figure 5:
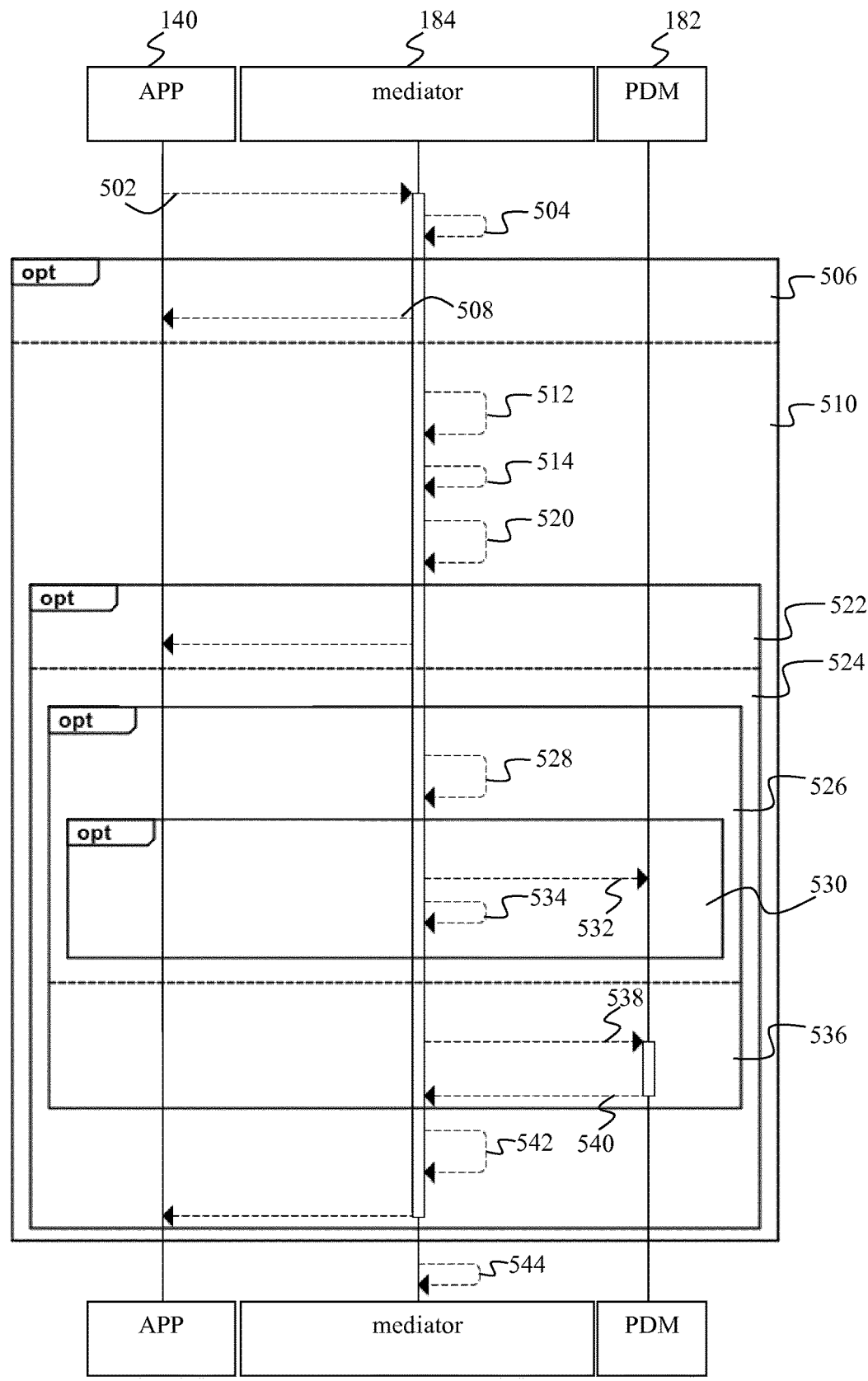
FIG. 5 is a sequence diagram of interactions among the PD managing system and an APP, when the APP running on the user device of a user is requesting PD of the user according to an embodiment of the present invention.

FIG. 5 is a sequence diagram 400 of interactions among the PD managing system 180 and an APP 140, when the APP 140 running on the user device 120 of a user 160 is requesting PD of the user 160 according to an embodiment of the present invention.

When an APP 140 running on the user device 120 needs to access PD, it sends a request (e.g., coded as a query on the desired PD of the user 160 of the user device 120) to the mediator 184 (e.g., the client side mediator 184"), associating the request with the authorization token and the APP token corresponding to the APP 140 (interaction 502).

The mediator 184 (e.g., the client side mediator 184") checks the validity of the authorization token and of the APP token (interaction 504).

If at least one among the authorization token and the APP token are not valid (option 506) the mediator 184 (e.g., the client side mediator 184") sends an error message to the APP 140, denying the PD access. The authorization token may not be valid if the user 160 has suspended it, while the APP token may not be valid if what has been declared during the APP 140 certification does not correspond to what is actually requested by the APP 140.

If instead both the authorization token and the APP token are valid (option 510), the procedure continues as follows.

The mediator 184 (e.g., the client side mediator 184") gets the certification corresponding to the APP 140 (interaction 512).

Then, the mediator 184 (e.g., the client side mediator 184") gets the user-defined policies corresponding to the APP 140 (interaction 514), and enforces rules to guarantee that the APP 140 accesses PD according to the requirements declared by the developer in the statement (interaction 520).

If the requirements declared by the developer in the statements are not fulfilled (option 522), the mediator 184 (e.g., the client side mediator 184") sends an error message to the APP 140, denying the PD access.

If instead the requirements declared by the developer in the statements are fulfilled (option 524), the procedure continues as follows.

At this point, if the APP 140 requests to access real time PD, such as for example the current GPS location of the user device 120 or the Web page the user 160 is browsing, (option 526), the mediator 184 (e.g., the client side mediator 184") starts to collect PD from the user device 120 applying policies obligations (interaction 528) in order to guarantee that PD are accessed only according to the user defined policies. If the accessed PD is to be collected (option 530)

the accessed PD is sent to the PDM 182 to be stored (interaction 532) through the mediator 184 (e.g., through the server side mediator 184').

In this case, the mediator 184 generates a corresponding log to keep trace of the collection of PD stored in the PDM 182 (interaction 534).

If instead the APP 140 requests to access PD already stored in the PDM 182 (option 536), the client-side mediator 184" passes the requests to the server side mediator 184', which accesses the PDM 182 to retrieve the requested PD (interaction 538) by applying policies obligations (interaction 540) in order to guarantee that PD are accessed only according to the user defined policies. The retrieved PD is then passed to the client side mediator 184".

In both the two abovementioned cases, i.e., in case the requested PD access relates to real time PD or to PD that is already stored in the PDM, after the mediator 184 (e.g., the client side mediator 184") has collected the requested PD, and after an optional addition of information relating to the quality of the collected PD (interaction 542), the mediator 184 (e.g., the client side mediator 184") finally delivers the collected PD to the APP 140.

At this point, the server side mediator 184' and/or the client side mediator 184" generate a log about the outcome of the PD access requests, the PD actually accessed, and/or the policy rules that have been enforced (interaction 544). This log will be processed in order to create reports on the (general) behavior of the APP 140 and on accesses to the PD of the user 160.

The proposed PD managing system 180 features the following advantages.

First of all, the proposed solution avoids the fragmentation and the redundancy of PD produced by user devices by providing a trusted unique point of access (i.e., the PDM 182).

By keeping up to date the PD, and ensuring that such PD are trusted and original, it provides APP developers with high quality data.

Moreover, the proposed solution offers a homogenous view of PD generated by different sources.

It certificates and label APPs, providing users of an APP distribution platform with an immediate and easy way of identifying the APP that trustfully manage their PD.

It provides the users with a user-centric PD managing system capable of controlling and continuously monitoring PD over their entire lifecycle.

It increases the awareness of users on PD and the relative level of risks for the privacy arising from possible misuses.

The invention claimed is:

1. A method for managing personal data of a user of a user device, wherein the user device is configured to have installed thereon an application (APP), and wherein the APP is configured to request access to the personal data when running on the user device, the method comprising:
creating a certification for the APP, wherein the certification is based on a corresponding statement indicating types of the personal data and indicating access policies of the APP for each of the types of the personal data, wherein the access policies of the APP indicate whether the APP is configured to request access to each of the types of the personal data;
associating the certification to the APP for certifying the APP;
allowing the user to provide user-defined policies about exploiting the personal data;
determining whether the user-defined policies provided by the user are consistent with the access policies of the APP indicated in the corresponding statement;
based on determining that the user-defined policies are consistent with the access policies of the APP indicated in the corresponding statement, executing the following operations when receiving, from the APP running on the user device, a request to access the personal data:
determining whether the request to access the personal data is in compliance with the access policies of the APP indicated in the corresponding statement; and
based on determining that the request to access the personal data is in compliance with the access policies of the APP indicated in the corresponding statement, executing the following operations:
if the request to access the personal data comprises a request to access real time personal data, collecting the real time personal data from the user device according to the user-defined policies and storing the collected real time personal data in a secured digital space; and
if the request to access the personal data comprises a request to access data already stored in the secured digital space, retrieving the data from the secured digital space according to the user-defined policies; and
when the user executes the APP initially, executing an authorization process directed to allow the user to grant personal data access, the authorization process comprising:
generating an authorization token representing a specific user-APP subscription;
executing the determining whether the user-defined policies provided by the user are consistent with the access policies of the APP indicated in the corresponding statement; and
based on the determining whether the user-defined policies provided by the user are consistent with the access policies of the APP indicated in the corresponding statement, processing the authorization token.

2. The method according to claim 1, wherein the authorization process further comprises:
if the user-defined policies are consistent with the access policies of the APP indicated in the corresponding statement, activating the authorization token; and
if the user-defined policies are not consistent with the access policies of the APP indicated in the corresponding statement, suspending the authorization token to avoid a possibility that the APP requests the personal data.

3. The method according to claim 1, wherein the exploiting the personal data comprises one or more of:
accessing the personal data;
collecting the personal data;
using the personal data;
managing the personal data;
disclosing the personal data; or
sharing the personal data.

4. The method according to claim 1, wherein the access policies of the APP indicated in the corresponding statement comprise one or more of:
a list of specific personal data accessed, collected, shared, and/or generated by the APP;
how the personal data are used;
frequency of usage of the personal data; or whether the APP requires a specific profile for the user or not.

5. The method according to claim 1, further comprising generating a log indicating one or more of:
outcomes of accesses of the personal data by the APP;
personal data actually accessed by the APP; or
policy rules that have been enforced.

6. The method according to claim 5, further comprising processing the log to create reports on general behavior of the APP and on accesses to the personal data of the user.

7. A system for managing personal data of users of user devices, wherein each user device of user devices is configured to have installed thereon applications (APPs), and wherein the APPs are configured to request access to the personal data when running on the user device, the system comprising:
a personal data manager unit comprising, for a user of each user device of the user devices, a corresponding secure digital memory configured to store at least a portion of the personal data that the user has authorized to collect; and
a server comprising a hardware processor configured to execute software instructions that cause the server to:
collect requests of the personal data and logs regarding the requests, store the personal data and the requests in the personal data manager unit, and perform verifying operations to decide whether to satisfy or refuse the collected requests of the personal data;
allow the user to provide user-defined policies about exploiting the personal data;
store statements, of the APPs, generated by developers of the APPs, wherein a statement of an APP of the APPs indicates types of the personal data and access policies for each of the types of the personal data, wherein the access policies indicate whether the APP is configured to request access to each of the types of the personal data, the server being further configured to accept requests for certifications provided by the developers, the certifications being based on the statements, and further configured to satisfy the requests of the personal data made by the APP based on determining that:
the user-defined policies are consistent with the access policies indicated in the corresponding statement of the APP;
the requests of the personal data are compliant with the access policies indicated in the corresponding statement of the APP; and
the requests of the personal data are compliant with the user-defined policies; and
when the user executes the APP initially, execute an authorization process directed to allow the user to grant personal data access, the authorization process comprising:
generating an authorization token representing a specific user-APP subscription;
determining whether the user-defined policies provided by the user are consistent with the access policies indicated in the corresponding statement of the APP; and
based on the determining whether the user-defined policies provided by the user are consistent with the access policies indicated in the corresponding statement of the APP, processing the authorization token.

8. The system of claim 7, wherein the user device comprises a processor configured to execute software instructions that cause the user device to interface and mediate among the APPs requesting to access and/or use the personal data and sources of the personal data, and provide new personal data generated by and through the APPs.

9. The system of claim 8, wherein the personal data manager unit is located on the server.

10. One or more non-transitory computer readable media for managing personal data of a user of a user device, wherein the user device is configured to have installed thereon an application (APP), and wherein the APP is configured to request access to the personal data when running on the user device, the one or more non-transitory computer readable media storing instructions that, when executed, cause a computing device to:
create a certification for the APP, wherein the certification is based on a corresponding statement indicating types of the personal data and indicating access policies of the APP for each of the types of the personal data, wherein the access policies of the APP indicate whether the APP is configured to request access to each of the types of the personal data;
associate the certification to the APP for certifying the APP;
allow the user to provide user-defined policies about exploiting the personal data;
determine whether the user-defined policies provided by the user are consistent with the access policies of the APP indicated in the corresponding statement;
if the user-defined policies are consistent with the access policies of the APP indicated in the corresponding statement, and when receiving, from the APP running on the user device, a request to access the personal data:
determine whether the request to access the personal data is in compliance with the access policies of the APP indicated in the corresponding statement;
if the request to access the personal data is not in compliance with the access policies of the APP indicated in the corresponding statement, deny the request to access the personal data; and
if the request to access the personal data is in compliance with the access policies of the APP indicated in the corresponding statement:
if the request to access the personal data comprises a request to access real time personal data, collect the real time personal data from the user device according to the user-defined policies and store the collected real time personal data in a secured digital space; and
if the request to access the personal data comprises a request to access data already stored in the secured digital space, retrieve the data from the secured digital space according to the user-defined policies; and
when the user executes the APP initially, execute an authorization process directed to allow the user to grant personal data access, the authorization process comprising:
generating an authorization token representing a specific user-APP subscription;
determining whether the user-defined policies provided by the user are consistent with the access policies of the APP indicated in the corresponding statement; and
based on the determining whether the user-defined policies provided by the user are consistent with the access policies of the APP indicated in the corresponding statement, processing the authorization token.

11. The method according to claim 1, wherein the processing the authorization token comprises activating the authorization token.

12. The system of claim 7, wherein the processing the authorization token comprises activating the authorization token.

13. The one or more non-transitory computer readable media of claim 10, wherein the processing the authorization token comprises activating the authorization token.

* * * * *